United States Patent [19] [11] 4,448,675
Chu [45] May 15, 1984

[54] SILICO-CRYSTAL ZSM-48 METHOD OF PREPARING SAME AND CATALYTIC CONVERSION THEREWITH

[75] Inventor: Pochen Chu, West Deptford, N.J.

[73] Assignee: Mobil Oil Corporation, New York, N.Y.

[21] Appl. No.: 484,748

[22] Filed: Apr. 14, 1983

Related U.S. Application Data

[60] Division of Ser. No. 303,276, Sep. 17, 1981, Pat. No. 4,397,827, and a continuation-in-part of Ser. No. 56,754, Jul. 12, 1979, abandoned.

[51] Int. Cl.$^3$ .............. C10G 11/05; C10G 45/64; C10G 45/12; C10G 45/54
[52] U.S. Cl. .............. 208/118; 208/120; 208/138; 585/739
[58] Field of Search ............ 208/118, 120, 109, 111

[56] References Cited

U.S. PATENT DOCUMENTS 3,970,544 7/1976 Rosinski et al. .............. 208/111
4,288,647 9/1981 Chu .............. 585/467
4,300,011 11/1981 Rollmann .............. 585/467
4,302,620 11/1981 Chu .............. 585/467

Primary Examiner—Delbert E. Gantz
Assistant Examiner—O. Chaudhuri
Attorney, Agent, or Firm—Alexander J. McKillop; Michael G. Gilman; Charles J. Speciale

[57] ABSTRACT

A new porous silico-crystal, designated as ZSM-48, a method of making same and the use thereof in catalytic conversion of organic compounds. The new product has a composition, expressed in terms of moles of anhydrous oxides per 100 moles of silica as follows:

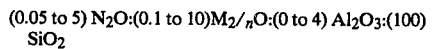

$$(0.05 \text{ to } 5) N_2O:(0.1 \text{ to } 10)M_{2/n}O:(0 \text{ to } 4) Al_2O_3:(100) SiO_2$$

wherein M is at least one cation having a valence n, N is a mixture of $C_2$–$C_{12}$ alkylamine and more preferably of $C_3$–$C_5$ tetramethyl ammonium compound, and wherein the zeolite is characterized by the distinctive x-ray powder diffraction pattern shown in Table I.

3 Claims, No Drawings

SILICO-CRYSTAL ZSM-48 METHOD OF PREPARING SAME AND CATALYTIC CONVERSION THEREWITH

CROSS REFERENCE TO RELATED CASES

This is a division of copending application Ser. No. 303,276, filed Sept. 17, 1981, now U.S. Pat. No. 4,397,827 and a continuation-in-part of Ser. No. 056,754, filed July 12, 1979, abandoned.

BACKGROUND OF THE INVENTION

1. Field of the Invention

This invention relates to a novel porous silico-crystal, designated as ZSM-48, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal, an alkaline earth metal cation, or an organic species such as a quaternary ammonium cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), and zeolite ZSM-12 (U.S. Pat. No. 3,832,449), merely to name a few.

The $SiO_2/Al_2O_3$ ratio of a given zeolite is often variable. For example, zeolite X can be synthesized with $SiO_2/Al_2O_3$ ratio of from 2 to 3; zeolite Y, from 3 to about 6. In some zeolites the upper limit of $SiO_2/Al_2O_3$ ratio is unbounded. ZSM-5 is one such example wherein $SiO_2/Al_2O_3$ ratio is at least five. U.S. Pat. No. 3,941,871 discloses a crystalline metal organosilicate essentially free of aluminum and exhibiting an x-ray diffraction pattern characteristic of ZSM-5 type aluminosilicates. U.S. Pat. Nos. 4,061,724, 4,073,865 and 4,104,294 describe microporous, crystalline silicas or organosilicates.

SUMMARY OF THE INVENTION

The present invention is directed to a novel porous silico-crystal, designated as ZSM-48, a method for its preparation, and the conversion of organic compounds contacted therewith.

The porous zeolite crystal composition can be identified, in terms of moles of anhydrous oxides per 100 moles of silica as follows:

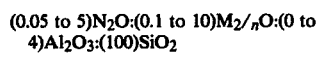

wherein M is at least one cation having a valence n, N is a mixture of a $C_2$–$C_{12}$, and more preferably of a $C_3$–$C_5$ alkylamine and a tetramethyl ammonium compound and wherein the composition is characterized by the distinctive x-ray diffraction pattern as shown in Table 1 below.

The original cations can be replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The x-ray diffraction pattern of the silico-crystal of the present invention has the significant lines shown in Table 1 and is further characterized by the fact that it exhibits a singlet line within the range of 11.8±0.2 Angstrom units. The novel crystal of this invention does not have more than one x-ray diffraction line at 11.8±0.2 Angstrom units. The presence of only a singlet line at the indicated spacing structurally distinguishes the instant material from closely related materials such as ZSM-12 (U.S. Pat. No. 3,832,449) which has a doublet (two lines) at 11.8±0.2 Angstrom units and high silica ZSM-12 (U.S. Pat. No. 4,104,294) which also exhibits a doublet at 11.8±0.2 Angstrom units.

TABLE 1

| Characteristics Lines of New Silico-Crystal* ||
| d(A) | Relative Intensity (I/I$_o$) |
| --- | --- |
| 11.8 ± 0.2 | S |
| 10.2 ± 0.2 | W–M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

*In the calcined, sodium-exchanged form.

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, $100\ I/I_o$, where $I_o$ is the intensity of the strongest line or peak, and d (obs.), the interplanar spacing in A corresponding to the recorded lines, were calculated. In Table 1 the relative intensities are given in terms of the symbols W=weak, VS=very strong, M=medium and W-S=weak-to-strong (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The new product can be prepared from a reaction mixture containing a source of silica, tetramethyl ammonium compound, $C_2$–$C_{12}$ alkylamine, an alkali metal oxide, e.g. sodium, with or without a source of alumina, and water, and having a composition, in terms of mole ratios of oxides, falling within the following ranges:

| REACTANTS | BROAD | PREFERRED |
|---|---|---|
| $Al_2O_3/SiO_2$ | 0 to 0.08 | 0 to 0.02 |
| $Na_2O/SiO_2$ | 0.01 to 1.0 | 0.1 to 0.5 |
| $N_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | wherein N is a mixture of a $C_2$–$C_{12}$ alkylamine and tetramethyl ammonium compound, and maintaining the mixture at 80°–200° C. until crystals of the new material are formed.

The molar ratio of $C_2$–$C_{12}$ alkylamine to tetramethyl ammonium compound is not narrowly critical and can range from 1:1 to 10:1. The tetramethyl ammonium compound can include the hydroxide or halide with the chloride being particularly preferred.

The new product can also be used as a catalyst in intimate combination with an additional hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, to the extent as in the structure, impregnated therein or physically intimately admixed therewith. Such component can be impregnated in or onto it such as, for example, by, in the case of platinum, treating the silico-crystal with a solution containing a platinum metal-containing ion. Thus, suitable platinum compounds include chloroplatinic acid, platinous chloride and various compounds containing the platinum amine complex.

The above silico-crystal especially in its metal, hydrogen, ammonium, alkylammonium and arylammonium forms can be beneficially converted to another form by thermal treatment. This thermal treatment is generally performed by heating one of these forms at a temperature of at least 700° F. for at least one minute and generally not greater than 20 hours. While subatmospheric pressure can be employed for the thermal treatment, atmospheric pressure is desired for reasons of convenience. The thermal treatment can be performed at a temperature up to about 1700° F. The thermally treated product is particularly useful in the catalysis of certain hydrocarbon conversion reactions.

The new silico-crystal when employed either as an adsorbent or as a catalyst in one of the aforementioned processes should be dehydrated, at least partially. This can be done by heating to a temperature, in the range of 200° to 600° C. in at atmosphere, such as air, nitrogen, etc. and at atmospheric, subatmospheric or superatmospheric pressures for between 1 and 48 hours. Dehydration can also be performed at room temperature merely by placing the ZSM-48 type catalyst in a vacuum, but a longer time is required to obtain a sufficient amount of dehydration.

DESCRIPTION OF PREFERRED EMBODIMENTS

Preferably, crystallization is carried out under pressure in an autoclave or static bomb reactor, at 80° to 200° C. Thereafter, the crystals are separated from the liquid and recovered. The composition can be prepared utilizing materials which supply the appropriate oxide. Such compositions include sodium silicate, silica hydrosol, silica gel, silicic acid, sodium hydroxide, and optionally a source of aluminum such as alumina gel and aluminum sulfate.

As indicated above, the compounds prepared by the instant invention are formed in a wide variety of particular sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the silico-crystal can be extruded before drying or dried or partially dried and then extruded.

In the case of many catalysts it is desired to incorporate the new product with another material resistant to the temperatures and other conditions employed in organic conversion processes. Such materials include active and inactive materials and synthetic or naturally occuring zeolites as well as inorganic materials such as clays, silica and/or metal oxides. The latter may be either naturally occurring or in the form of gelatinous precipitates or gels including mixtures of silica and metal oxides. Use of a material in conjunction with the new composition, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g. bentonite and kaolin, to improve the crush strength of the catalyst under commercial operating conditions. Said material, i.e. clays, oxides, etc., function as binders for the catalyst. It is required to provide a catalyst having good crush strength because in commercial use it is desirable to prevent the catalyst from breaking down into powder-like materials. These clay binders have been employed normally only for the purpose of improving the crush strength of the catalyst.

Naturally-occurring clays which can be composited with the new ZSM-48 crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment of chemical modification. Binders useful for compositing with the new silico-crystal also include inorganic oxides, notably alumina.

In addition to the foregoing materials, the ZSM-48 crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided silico-crystal and inorganic oxide gel matrix vary widely with the silico-crystal content ranging from about 1 to about 90 percent by weight and more usually, particularly when the composite is prepared in the form of beads, in the range of about 2 to about 50 percent by weight of the composite.

Employing a catalytically active form of the composition of this invention containing a hydrogenation component, reforming stocks can be reformed employing a temperature between 700° F. and 1000° F. The pressure can be between 100 and 1000 psig but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g. platinum. Hydroisomerization is carried out at a temperature between 200° and 700° F., preferably 300° to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin or aromatic isomerization employing temperatures between 30° and 700° F.

The catalyst can also be used for reducing the pour point of gas oils. This reduction is carried out at a liquid hourly space velocity between about 10 and about 30 and a temperature between about 800° and about 1000° F.

Other reactions which can be accomplished employing the catalyst of this invention containing a metal, e.g. platinum, include hydrogenation-dehydrogenation reactions and desulfurization reactions, olefin polymerization (oligomerization), and other organic compound conversion such as the conversion of alcohols, (e.g. methanol) to hydrocarbon.

In order to more fully illustrate the nature of the invention and the manner of practicing same, the following examples are presented, wherein porous ZSM-48 crystals of good crystallinity were prepared from mixes of the composition range:

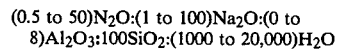
$(0.5 \text{ to } 50)N_2O:(1 \text{ to } 100)Na_2O:(0 \text{ to } 8)Al_2O_3:100SiO_2:(1000 \text{ to } 20,000)H_2O$ wherein N is a mixture of $C_2$-$C_{12}$ alkylamine and a tetramethyl ammonium compound.

In the examples which follow whenever adsorption data are set forth for comparison of sorptive capacities for water, cyclohexane and n-hexane, they were determined as follows:

A weighed sample of the calcined composition was contacted with the desired pure adsorbate vapor in an adsorption chamber, evacuated to less than one mm Hg and then contacted with 12 mm Hg of water vapor or 20 mm Hg of cyclohexane or n-hexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period which did not exceed about eight hours. As the adsorbate was adsorbed by the silico-crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample.

EXAMPLE 1

The preparation of this new material was carried out in a five gallon capacity autoclave with the following composition: a silicate solution comprising 1718 grams of Q-brand sodium silicate (28.8% $SiO_2$, 8.9% $Na_2O$, 62% $H_2O$) and 4000 g of water, an acid solution comprising 172 g of $H_2SO_4$. Six hundred g of 50% wt. tetramethylammonium chloride and 4100 g $H_2O$, and 800 g of n-propylamine. The silicate and acid solution was charged to the autoclave first and followed by n-propylamine. After approximately 46 hours at 320° F. and 90 rpm agitation, the reaction mixture crystallized into a product of mainly ZSM-48 material which is in the shape of needles. Some other material has also been found which appears to be octahedral in shape and it is apparently a metastable precursor of ZSM-48.

Elemental analysis was as follows:

| | |
|---|---|
| Na | 0.27% |
| Si | 93.2% |
| Al | 0.40% |
| N | 0.18% |

Adsorption Capacity was as follows:

| | |
|---|---|
| $H_2O$ | 1.8% |
| Cyclohexane | 0.3% |
| n-hexane | 3.7% |

The following Table II shows the x-ray diffraction data of the product after separation to remove impurities and calcined.

TABLE II

X-Ray Data For Product of Example 1 Calcined 21 Hours at 500° C.

| 2 times theta | d(A) | 100 I/$I_o$ |
|---|---|---|
| 7.48 | 11.82 | 74 |
| 8.67 | 10.20 | 29 |
| 12.30 | 7.20 | 7 |
| 12.83 | 6.90 | 3 |
| 14.50 | 6.11 | 7 |
| 15.10* | 5.87 | 20 |
| 15.78* | 5.62 | 4 |
| 16.75 | 5.29 | 1 |
| 17.55 | 5.05 | 2 |
| 18.14 | 4.89 | 2 |
| 18.60 | 4.77 | 1 |

TABLE II-continued

X-Ray Data For Product of Example 1 Calcined 21 Hours at 500° C.

| 2 times theta | d(A) | 100 I/I$_o$ |
|---|---|---|
| 19.02 | 4.67 | 1 |
| 19.90 | 4.46 | 2 |
| 20.52 | 4.33 | 2 |
| 21.06 | 4.22 | 82 |
| 21.75 | 4.09 | 9 |
| 22.25 | 4.00 | 8 |
| 22.83 | 3.90 | 100 |
| 23.80 | 3.74 | 3 |
| 24.55 | 3.63 | 3 |
| 24.80 | 3.59 | 4 |
| 25.70 | 3.47 | 3 |
| 26.45 | 3.37 | 4 |
| 27.22* | 3.28 | 4 |
| 27.67 | 3.22 | 1 |
| 29.02 | 3.08 | 4 |
| 30.67 | 2.91 | 1 |
| 31.36 | 2.85 | 14 |
| 32.77 | 2.73 | 3 |
| 34.12 | 2.63 | 2 |
| 35.62 | 2.52 | 3 |
| 36.13 | 2.49 | 3 |
| 36.48 | 2.46 | 4 |
| 37.85 | 2.38 | 4 |
| 38.30 | 2.35 | 3 |
| 40.30 | 2.24 | 2 |
| 43.05 | 2.10 | 3 |
| 44.00 | 2.06 | 3 |

*Intensity due to or enhanced by other component(s).

EXAMPLE 2

Fifty grams of the dried zeolite product from Example 1 were calcined in N$_2$ stream at 1000° F. for 3 hours to decompose most of the organics associated with the zeolite. Two NH$_4$ ion exchanges were carried out at room temperature with 5 cc of 1 NNH$_4$NO$_3$ solution per gram of sample for one hour each to reduce Na level of the sample to <0.02 wt. %. The ion exchanged sample was washed, dried and sized to 14/25 mesh prior to the final air activation step of 3 hours at 1000° F. One cc of the above activated sample was tested for its hydrocarbon-cracking activities on the standard α test* and was found to have an α-value of 6.4.

*The α-test gives an approximate indication of the catalytic cracking activity of the catalyst compared to a standard catalyst, and is the relative rate constant (rate of n-hexane conversion per unit volume of oxides composition per unit time). It is based on the activity of highly active silica alumina cracking catalyst taken as α=1. See U.S. Pat. No. 3,354,078 and Journal of Catalysis, Vol. 4, pp. 522-529 (August 1965) for further description of the α-test.

EXAMPLE 3

Five grams of the dried zeolite product from Example 1 were calcined in N$_2$ stream at 1000° F. for 3 hours. The calcined sample was ion exchanged twice with a mixed solution of 100 ml 0.1 N NaCl and 50 ml 0.1 N NaOH at room temperature for one hour each. The Na form sample was filtered, water washed and finally dried at 230° F. for at least 3 hours.

The x-ray diffraction data of the calcined sodium-exchanged product is given below in Table III.

TABLE III

| 2 Times Theta | d(A) | 100 I/I$_o$ |
|---|---|---|
| 7.55 | 11.71 | 51 |
| 8.72 | 10.14 | 22 |
| 12.36 | 7.16 | 6 |
| 12.93 | 6.85 | 3 |
| 14.54 | 6.09 | 8 |
| 15.14* | 5.85 | 21 |
| 15.84* | 5.59 | 5 |
| 17.60 | 5.04 | 3 |
| 18.17 | 4.88 | 4 |
| 18.68 | 4.75 | 2 |
| 19.10 | 4.65 | 2 |
| 19.56 | 4.54 | 2 |
| 20.02 | 4.44 | 4 |
| 20.48 | 4.34 | 4 |
| 21.09 | 4.21 | 74 |
| 21.72 | 4.09 | 11 |
| 22.22 | 4.00 | 11 |
| 22.88 | 3.89 | 100 |
| 23.89* | 3.72 | 10 |
| 24.47 | 3.64 | 5 |
| 24.89 | 3.58 | 10 |
| 25.38 | 3.51 | 7 |
| 25.80 | 3.45 | 7 |
| 26.17 | 3.41 | 4 |
| 26.52 | 3.36 | 8 |
| 27.22* | 3.28 | 5 |
| 29.06 | 3.07 | 3 |
| 30.72 | 2.91 | 1 |
| 31.40 | 2.85 | 11 |
| 32.65 | 2.74 | 1 |
| 32.98 | 2.72 | 2 |
| 33.53 | 2.67 | 1 |
| 34.19 | 2.62 | 1 |
| 35.67 | 2.52 | 2 |
| 36.20 | 2.48 | 3 |
| 36.60 | 2.46 | 2 |
| 37.06 | 2.43 | 2 |
| 37.55 | 2.40 | 2 |
| 37.94 | 2.37 | 4 |
| 38.34 | 2.35 | 2 |
| 39.52 | 2.28 | 1 |
| 40.30 | 2.24 | 1 |
| 43.10 | 2.10 | 2 |
| 44.06 | 2.06 | 2 |

*Intensity due to or enhanced by other component(s).

What is claimed is:

1. A process for effecting catalytic conversion of an organic charge which comprises contacting said charge under catalytic conversion conditions with a catalyst comprising the porous silico-crystal ZSM-48 having a composition expressed in terms of moles of anhydrous oxides, per 100 moles of silica, as follows:

(0.5 to 5)N$_2$O:(0.1 to 10)M$_{2/x}$O:(0 to 4)Al$_2$O$_3$:(100)SiO$_2$ wherein M is at least one cation having a valence n, N is a mixture of a C$_2$–C$_{12}$ alkylamine compound and tetramethylammonium compound, and wherein said crystal is characterized by the X-ray diffraction pattern whose values are set forth in Table I of the specification and which exhibits a singlet line within the range of 11.8 0.2 Angstrom units.

2. The process of claim 1 wherein the original cations in said ZSM-48 have been replaced by hydrogen, ammonium, or a metal of Groups IIA, IIB, IVB, IVA, IIIB, VB, VIB, VIIB and VIII of the Periodic Table or mixtures thereof.

3. The process of claim 1 wherein the ZSM-48 has been thermally treated.

* * * * *